United States Patent
Facy

[11] 3,913,393
[45] Oct. 21, 1975

[54] EMULSION LAYER OF COLOURED INDICATORS FOR DETERMINING SPECTRA OF THE EFFECTS OF A FLUID ON A SURFACE

[75] Inventor: Leopold Facy, Bures-sur-Yvette, France

[73] Assignee: Omnium Technique d'Administration et de Gestion O.T.A., Tours, France

[22] Filed: Mar. 6, 1972

[21] Appl. No.: 231,983

[52] U.S. Cl............. 73/105; 23/230 C; 23/230 R; 23/253 TP; 35/50; 35/53; 106/125; 106/129; 264/78; 264/79; 427/414; 73/188; 73/432 SD
[51] Int. Cl............................................. B29c 1/04
[58] Field of Search .......... 117/81, 1, 105.1, 135.5; 106/125, 129; 23/230 R, 230 C, 253 TP; 35/50, 53; 264/78, 79

[56] References Cited
UNITED STATES PATENTS

| | | |
|---|---|---|
| 2,279,446 | 4/1942 | Cooke.................................... 35/41 |
| 3,092,465 | 6/1963 | Adams et al..................... 23/253 TP |
| 3,290,228 | 12/1966 | Gretton et al................... 23/253 TP |
| 3,298,789 | 1/1967 | Mast .............................. 23/253 TP |
| 3,418,083 | 12/1968 | Rey et al........................... 23/230 C |
| 3,438,737 | 4/1969 | Atkinson........................... 23/230 R |
| 3,607,093 | 9/1971 | Stone ............................. 23/253 TP |
| 3,634,951 | 1/1972 | Knoll ...................................... 35/41 |

*Primary Examiner*—William R. Trenor

[57] ABSTRACT

Emulsion layer of coloured indicators is applied to a surface for the purpose of determining iso-concentration curves of the effects of a flow of fluid on the relief of that surface; the layer is covered with a transparent membrane permeable to small molecules and impermeable to large molecules such as those of organic products or dyes. A layer of this kind may be applied to a model of a geographical site in order to determine the pollution conditions that sources of pollution, such as smokestacks, may inflict upon that site.

10 Claims, 1 Drawing Figure

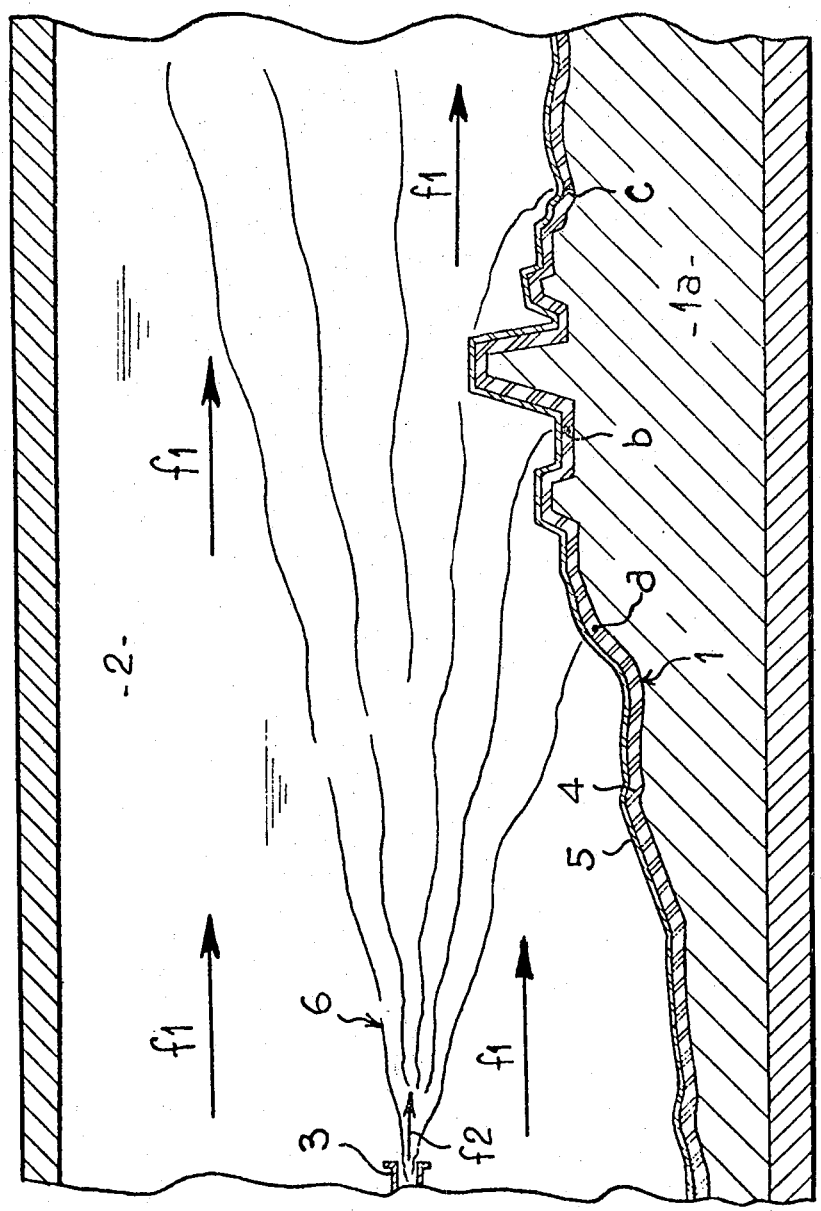

EMULSION LAYER OF COLOURED INDICATORS FOR DETERMINING SPECTRA OF THE EFFECTS OF A FLUID ON A SURFACE

The invention relates to an emulsion layer of coloured indicators to be applied to a surface for the purpose of determining on that surface, iso-concentration curves of the effects produced, for example, by the relief or roughness of the surface on the characteristics of a flow of fluid. This invention also pertains to a method for producing such a layer on a surface designed to be exposed to the effects of a fluid.

The layer and method according to the present invention may be applied to numerous industrial or laboratory investigations requiring an overall survey of the results of phenomena governed by the characteristics, of a physical nature, of the surface of a wall.

A layer and a method of this kind are quite applicable, for instance, to a laboratory mock-up produced, by mathematical similarity methods, from a particular geographical site in order to determine the pollution conditions which may be produced in the atmosphere at the site by sources of pollution, especially smokestacks. In such a case, an emulsion of normal "coloured indicators" is applied in a suitable manner to the surface of the mock-up, whereupon the latter is preferably immersed in the flow from a jet of liquid which carries along a flow of reagents, similar to the flow of pollutants, suitably located in relation to the mock-up. The contours of the mockup will react upon the flow from the jet to product therein a special distribution of surfaces of equal concentration of reagents, and the coloured indicators (suitably selected) will cause to appear on the surface of the mock-up a spectrum corresponding to the distribution.

The emulsion layer according to the invention may easily be prepared, by using conventional methods, from coloured indicators and various excipients, especially conventional excipients such as bone gelatine.

According to one essential characteristic of the invention, the emulsion layer of coloured indicators is covered by a film-like transparent membrane permeable to small molecules (water, hydronium ions or the like) and impermeable to large molecules such as "organic molecules" (bone gelatine) or dye. A membrane of this kind may be very thin, and it will be understood that it provides effective protection of the emulsion against the outside effects of the flow of fluid which might falsify the iso-concentration spectrum to be revealed by the emulsion; for example, in the case of a gelatine-base emulsion, this film opposes the dissolution of the gelatine in the water from the jet.

In a first embodiment of the invention, the pellicular protective membrane is obtained, in situ, on the layer and comprises the ferrocyanide of a metal. This membrane is similar to the semi-permeable membranes used in biology. Such a membrane is in intimate contact with its emulsion layer and has very little thickness; it is, however, remarkably effective in preventing the products of the emulsion from dissolving in the liquid from the jet and thus producing false spectra.

In a second embodiment of the invention, the protective membrane is in the form of a very thin and porous film of a suitable plastic material, especially a nitrocellulose. Such a membrane resists impact and pressure variations to which a mock-up of the type mentioned above may be subjected, and it exhibits:

a regular and identical structure over all parts of the mock-up;
satisfactory transparency and little thickness, thus eliminating false spectra;
satisfactory resistance to concentrated acids or strong bases.

This membrane may be produced from a solution, in an appropriate solvent, of a plastic material capable of producing a porous film by addition of a third component which may be water-soluble or volatile.

Thus, use may be made of a normal collodion consisting mainly of a mixture of nitrocellulose, a solvent (especially acetone), and a jellifier (for example, a mixture of alcohol and water). Such a solution may produce a membrane having the following properties:

a mechanical strength which will be greater, and
pores which will be finer (thus reducing permeability) as the proportion of acetone is higher, and the proportion of alcohol and water is lower.

The invention will be better understood if reference is made to the attached drawing which illustrates a preferred method of application of the invention.

In this drawing, the single FIGURE represents in section, partly cut away, and to a relatively large scale, the surface of a mock-up covered with a layer according to the invention.

In this figure, 1 is a surface constituting the free surface of a structure 1a mounted between the walls of a parallelepiped chamber 2. The vertical walls of this chamber 2 have apertures (not shown) which may be connected to a circuit with a flow jet of the "return" type. The chamber furthermore contains groups of movable shutters, honeycomb panels, and a device containing heater plates (not shown).

The horizontal and vertical dimensions of this surface 1 correspond, on a suitable scale, to the contours of a geographical site for the purpose of producing a mock-up of the said site.

The shutters, panels and heating device make it possible to regulate or modify at will the jet flow in this chamber. It may be pointed out in this connection that tests with a blower and with a jet of liquid have confirmed excellent similarity between the phenomena occurring on the actual site and with the mock-up. However, since jets of liquid have shown greater flexibility in adapting to atmospheric conditions, particularly having regard to heat stratification and wind gradient, a jet of liquid has been selected for this example.

In the case of liquid velocities between 1 and 30 cm/sec (arrows f1), the panels in chamber 2 assure a uniform flow over a cross-section of the chamber. Adjustment of the horizontal shutters produces a vertical gradient in the velocity of the liquid, and heating of the plate produces turbulence in the bottom layers of the jet. It should also be pointed out that mock-up 1 may be dismantled to permit various orientations (in relation to the direction of the jet), corresponding to various wind directions.

Moreover, surface irregularities due to forests and buildings are faithfully reproduced on surface 1 in order to modify correctly the boundary-layer flow on the surface. Finally, the mock-up is equipped with smokestacks 3 to scale.

A layer 4 of an emulsion of coloured indicators in gelatine is then applied to surface 1 of the mock-up; a semipermeable membrane 5 is then formed on layer 4, the thickness of the said membrane being of the order of a fraction of a micron, and the mock-up is finally installed in jet chamber 2.

Preparation of the layer of emulsion:
50 g of gelatine are dissolved in one litre of hot water (between 50° and 70° Celsius);
the following are crushed and intimately mixed in a mortar:
1. 5 g of methyl yellow (dimethylamino-4-azobenzene);
2. 3 g of bromocresol;
3. 8 g of potassium ferrocyanide (only in the case of Example 1 below).

Methyl yellow and bromocresol are two coloured indicators which detect pH values between 0 and 3; potassium ferrocyanide (Example 1) is intended to form, in situ, a semipermeable membrane having a cadmium ferrocyanide base.

4. the powder produced by this crushing operation is added to the hot gelatine solution, which produces a green solution since it has a pH value of about 4 (see Table below);
5. 10 cm$^3$ of a buffer solution of ammonia and ammonium chloride are added to this gelatine solution; this produces a blue shade corresponding to pH values of 5,6 .... to 14;
6. the solution is allowed to cool naturally to about 50°C;
7. this solution is then filtered through a 2/10th mm mesh screen.

a finer mesh would prevent the particles of dye, which are not dissolved but are in suspension, from passing. The solution thus screened makes it possible to produce, on the mock-up, a layer of uniform colour free from visible granulation.

After screening, the temperature of the solution is generally between 40° and 50°C. and it may then be applied to the mock-up.

Producing the layer of emulsion on the mock-up:
1. A very small quantity of the gelatine solution, kept at a temperature of about 40°, is sprayed progressively on to surface 1 of the mock-up;
2. a few minutes are allowed to pass, to allow the thin layer thus obtained to jellify, whereupon the operation is repeated; these precautions prevent the gelatine from sliding down slopes, thus avoiding irregularities in the thickness of the layer, for instance unduly thick layers in valleys and between adjacent buildings; homogeneous colouring and adequate opacity may be obtained by applying about 250 cm$^3$ of this solution per m$^2$ of the mock-up;
3. as soon as the last coat of spray has been applied, the layer is allowed to dry for 5 to 10 minutes; by that time the gelatine is of good consistency and the ammonia/ammonium chloride buffer solution imparts a blue colour to the mock-up.

Producing the semi-permeable layer:

EXAMPLE I a solution containing 4 percent by weight of cadmium chloride is prepared;
the cadmium-chloride solution is projected on to the layer of gelatine.

It is desirable to project about 150 cm$^3$ of this solution in the form of a relatively powerful jet, so that it may penetrate into the finest cracks in the gelatine and to avoid the formation of air bubbles which would prevent contact between the cadmium chloride and the potassium ferrocyanide in the gelatine.

Contact between these two products gives rise, at the surface of the layer of gelatine, to the formation of a film of cadmium ferrocyanide, the thickness of which is of the order of a few hundredths of a micron, and which is completely transparent.

About 1 hour after layer 4 and film 5 have been applied, the mock-up may be placed in chamber 2.

EXAMPLE II

A solution of collodion containing 4 percent of pure nitrocellulose in acetone, propyl alcohol, and water is prepared in the conventional manner; the table hereunder gives the proportions by weight of these components:

| collodion | 70% | density at 15° Celsius: | 0.760 |
| acetone | 29% | density at 15° Celsius: | 0.790 |
| propyl alcohol | 1% | density at 15° Celsius: | 0.802 |

When the gelatine in emulsion layer 4 is perfectly dry, the solution of collodion is sprayed on to it by means of a conventional spray-gum supplied with compressed air, to produce a thin layer 5.

This spraying must be carried out quickly in a single operation. In this connection, it is desirable to carry out beforehand a few tests on objects of some kind, in order to acquire the necessary dexterity for this spraying operation.

Furthermore, the gelatine in layer 4 must be perfectly dry, since any trace of moisture in this layer would quickly cause collodion membrane 5 to tear.

A small quantity of solvent (acetone) must be sprayed on membrane 5 in order to homogenize and thin it.

Finally, in order to obtain a pre-determined porosity, the collodion solution must also be sprayed at a predetermined temperature, since a few degrees difference in temperature may have a substantial effect on the perosity of the membrane.

The pore dimensions of this membrane are a function of the proportion of solvent to jellifier in the solution; in order to obtain a membrane having a pre-determined porosity, the jellifier must be as non-volatile as possible; this is why propyl alcohol is used in preference to the ethyl alcohol normally used in preparing collodion solutions.

The solution according to Example II produces with advantage a membrane the pore dimensions of which are between 0.2 and 3 microns.

This membrane dries in a few seconds, whereupon the mock-up may be immediately immersed in chamber 2.

Using the mock-up.

A standard hydrochloric-acid solution, for example, is injected into chamber 2 through smokestacks 3 (arrow f2).

A plume 6 forms at the outlet of each smokestack 3 due to turbulent diffusion of the acid in the hydraulic jet.

It should be noted that this emission of acid must be carefully controlled, especially with respect to:
flow (a constant-flow tank is used, with accurate flowmeters);

density of the flow emitted, which must be in equilibrium with the flow from the jet (this equilibrium is obtained by adding alcohol, for example).

These precautions eliminate, in the immediate vicinity of a source of emission 3, hydrostatic effects which might oppose the results if the effects of molecular density and diffusion are of the same order of magnitude as those produced by the turbulent diffusion to be demonstrated.

Small molecules (water, hydronium ions . . . ) and the ions from the jet may pass through membrane 5 and reach the methyl yellow and the bromocresol green, whereas membrane 5 opposes the passage of large molecules of an organic nature (dyes, gelatine).

It will therefore be understood that membrane 5 (made of cadmium ferrocyanide or nitrocellulose) protects layer 4 against the destructive effects of the jet, especially against dissolution of the gelatine.

It will also be understood that the iso-concentration surfaces of plume 6 reach layers 5 and 4 at points a,b,c, producing on the mock-up areas, ab, bc, exhibiting different colours of the solar spectrum, depending on the ion concentration in the parts of the plume in contact with layer 4; for example "ab" may be red, "bc" orange, etc.

The relationship between the colour, the pH value, the value of the concentration on the soil of a site, and the sulphurous anhydride emitted appear in the Table given below; the methyl yellow and bromocresol green used in this example have been reproduced in this Table. This makes it possible to evaluate, as a function of the colours at different locations on the mock-up, the concentrations of pollutants which would occur at the site as a result of emissions corresponding to those of the smokestacks.

Thus in the case of identical flows of acid on a part of the mock-up exhibiting a red colouration (a concentration on the soil of the site equal to $10^{-6}$ kg/m$^3$), an emission ten times smaller would produce a concentration on the ground equal to $10^{-7}$ kg/m$^3$.

| Colour (a) | Red | Orange | Yellow | Greenich yellow | Green | Blue |
| --- | --- | --- | --- | --- | --- | --- |
| pH in jet | 0 | 1 | 2 | 3 | 4 | 5 |
| concentration (b) | $10^{-6}$ | $10^{-7}$ | $10^{-8}$ | $10^{-9}$ | $10^{-10}$ | in kg/m$^3$ |
| Methyl yellow | Red | Pink F | Pink f | | Colourless | Colourless |
| bromocresol green | Yellow | | | | Blue | Blue |

(a) colour observed on the mock-up.
(b) concentration in kg/m$^2$ on the soil at the site for a flow of 1 kg/s of a sulphurous anhydride emission at the site.

Finally, it should be noted that in order to obtain valid results, the thickness of the gelatine layer and the roughness of its surface should show the same values at all points on the mock-up. It is difficult to control these two parameters and only long practice in the spraying of the gelatine makes it possible to produce a suitable layer.

Obviously other coloured indicators could be incorporated into the layer, the choice of these products being governed by the pH ranges to be covered and of the colorimetrical contrast desired; the reaction may be either acid or basic.

What I claim is:

1. A mock-up comprising: a surface having contours produced, by mathematical similarity methods, from a given geometrical site; a gelatin layer spread over said surface and containing colored indicators sensitive to reagents contained in a fluid flowing over said contours; and a thin, transparent, semi-permeable membrane over said layer selectively permitting certain molecules or ions to pass through said layer and contact said colored indicators whereby an indelible spectrum of the effects produced by the flow of said fluid on said contours is obtained.

2. A mock-up as defined in claim 1, wherein said coloured indicators include granules, the size of which is that of 2/10 mm mesh.

3. A mock-up as defined in claim 1, wherein said layer has a uniform thickness over said surface.

4. A mock-up as defined in claim 1, wherein said membrane has a uniform thickness over said layer.

5. A mock-up as defined in claim 1, wherein said membrane includes a dispersion of cadmium ferrocyanide.

6. A mock-up as defined in claim 4, wherein said membrane is made of collodion.

7. A method for making a mock-up having a surface produced, by 4athematical similarity methods, from a given geometrical site in order to determine on said surface iso-concentration curves produced by the effects of a flow of fluid, containing reagents, comprising the steps of: maintaining the temperature of a gelatin base emulsion, containing colored indicators, between 40° and 45° Celsius; spraying a very small quantity of said emulsion onto said surface to obtain a thin layer thereon; repeating the spraying, at least once, of an additional gelatin layer over the applied first thin layer allowing the thin layer to dry between successive sprayings; and spraying said layer with a thin, transparent, semi-permeable membrane to selectively permit certain molecules or ions to pass through said layer and contact said colored indicators whereby an indelible spectrum of the effects produced by said flow of fluid on said surface may be obtained.

8. A method as defined in claim 7 further comprising the steps of: incorporating potassium ferrocyanide in advance into the emulsion; projecting on to said layer a solution of cadmium chloride.

9. A method as defined in claim 7, further comprising spraying on said layer a solution of collodion, acetone and propyl alcohol.

10. A method as defined in claim 9, further comprising the step of spraying a solvent of said solution on said membrane.

* * * * *